(12) United States Patent
Kako et al.

(10) Patent No.: US 8,813,586 B2
(45) Date of Patent: Aug. 26, 2014

(54) STARTER MOTOR HAVING SEAL PLATE TO SEAL BEARING BOX FORMED IN END FRAME

(75) Inventors: Hiroshige Kako, Nagoya (JP); Kazuhiro Andoh, Okazaki (JP)

(73) Assignee: Denso Corporation, Kariya (JP)

( * ) Notice: Subject to any disclaimer, the term of this patent is extended or adjusted under 35 U.S.C. 154(b) by 886 days.

(21) Appl. No.: 12/292,831

(22) Filed: Nov. 26, 2008

(65) Prior Publication Data

US 2009/0133516 A1 May 28, 2009

(30) Foreign Application Priority Data

Nov. 26, 2007 (JP) ................................ 2007-304024

(51) Int. Cl.
*F02N 15/06* (2006.01)
*F16C 33/76* (2006.01)

(52) U.S. Cl.
USPC .................................................. 74/6; 384/489

(58) Field of Classification Search
USPC .......... 74/6, 7 R, 7 A, 7 E; 277/359, 931, 933, 277/317; 384/489
See application file for complete search history.

(56) References Cited

U.S. PATENT DOCUMENTS

| | | | | |
|---|---|---|---|---|
| 1,879,926 A | * | 9/1932 | Dow | 74/7 R |
| 2,622,934 A | * | 12/1952 | Phelps | 301/105.1 |
| 3,470,787 A | * | 10/1969 | Mackie | 411/377 |
| 3,877,411 A | * | 4/1975 | MacDonald | 116/207 |
| 4,459,046 A | * | 7/1984 | Spirg | 374/162 |
| 5,111,093 A | * | 5/1992 | Tanaka | 310/88 |
| 5,255,644 A | * | 10/1993 | Mills et al. | 123/179.31 |
| 5,380,103 A | * | 1/1995 | Lederman | 384/489 |
| 5,617,758 A | * | 4/1997 | Nishida et al. | 74/7 B |
| 5,796,172 A | * | 8/1998 | Morisita et al. | 290/48 |
| 6,570,283 B2 | | 5/2003 | Niimi et al. | |
| 6,763,735 B2 | * | 7/2004 | Siems et al. | 74/6 |
| 7,059,802 B1 | * | 6/2006 | Geier et al. | 404/117 |
| 2006/0285786 A1 | * | 12/2006 | Shige | 384/489 |
| 2007/0034459 A1 | * | 2/2007 | Matsushita et al. | 188/72.6 |
| 2008/0290760 A1 | * | 11/2008 | Matsushita et al. | 310/67 R |

FOREIGN PATENT DOCUMENTS

| | | |
|---|---|---|
| JP | A-08-054825 | 2/1996 |
| JP | A-08-074712 | 3/1996 |
| JP | B2-3575359 | 10/2004 |

OTHER PUBLICATIONS

Feb. 28, 2012 Office Action issued in Application No. 2007-304024 w/English translation.

* cited by examiner

*Primary Examiner* — Abigail A Risic
(74) *Attorney, Agent, or Firm* — Oliff PLC

(57) ABSTRACT

A starter motor is disclosed which includes: 1) a hollow yoke having an open end; 2) a magnetic field system provided on an inner periphery of the yoke; 3) an armature surrounded by the magnetic field system with a predetermined gap therebetween, the armature having an armature shaft; 4) an end frame that closes the open end of the yoke and has a bearing box formed therein, the bearing box being recessed inward of the yoke from an end face of the end frame and having an open end on the end face of the end frame, the bearing box also having a bearing disposed therein to rotatably support an end portion of the armature shaft; and 5) a flexible seal plate that is attached on the end face of the end frame to hermetically seal the open end of the bearing box formed in the end frame.

16 Claims, 4 Drawing Sheets

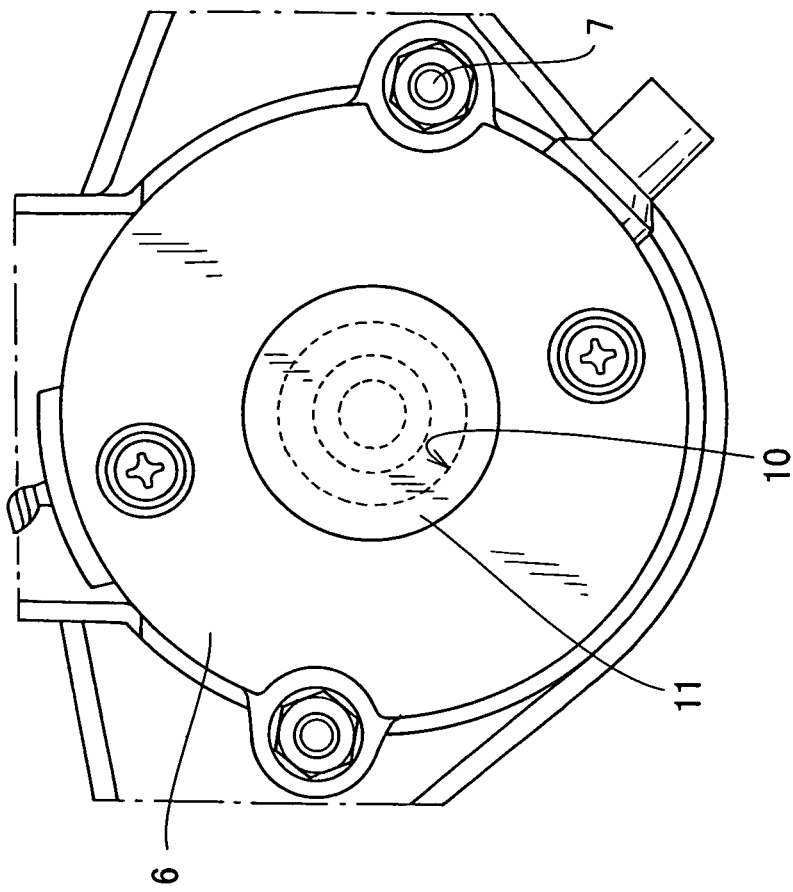
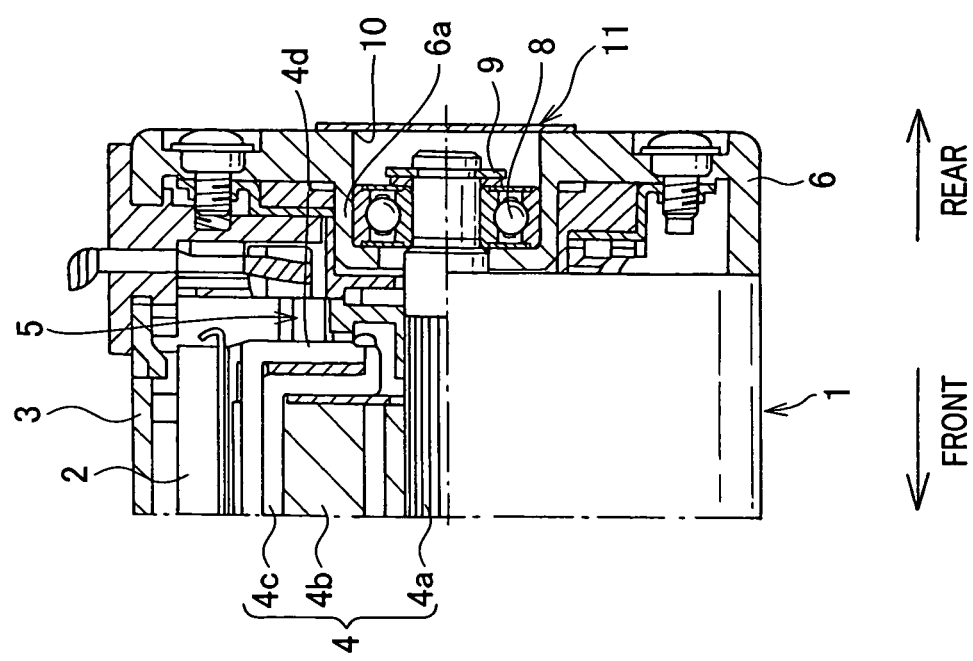

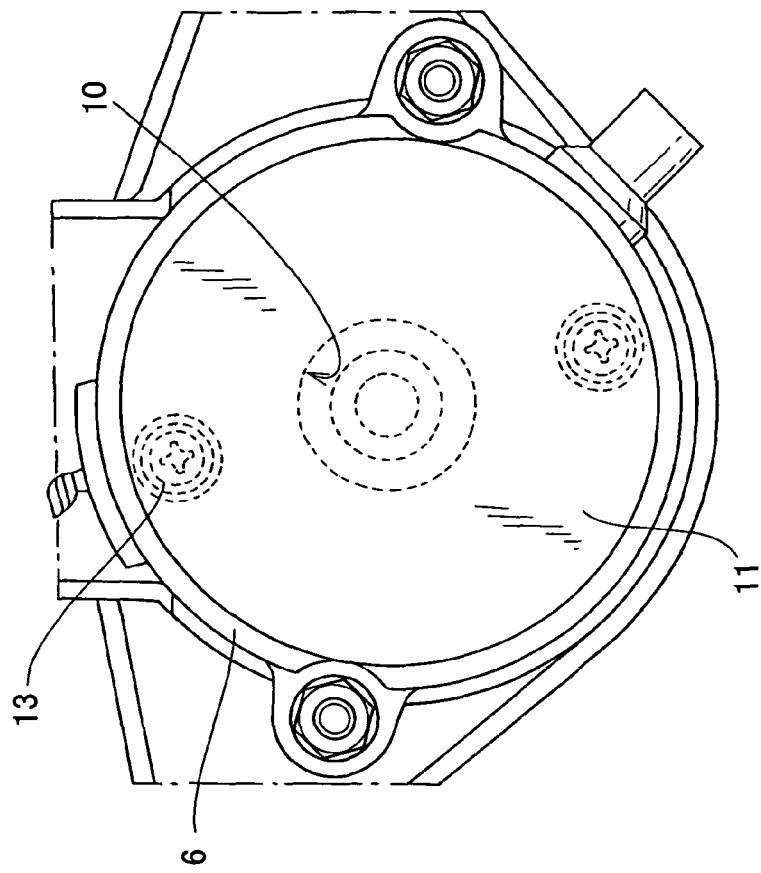
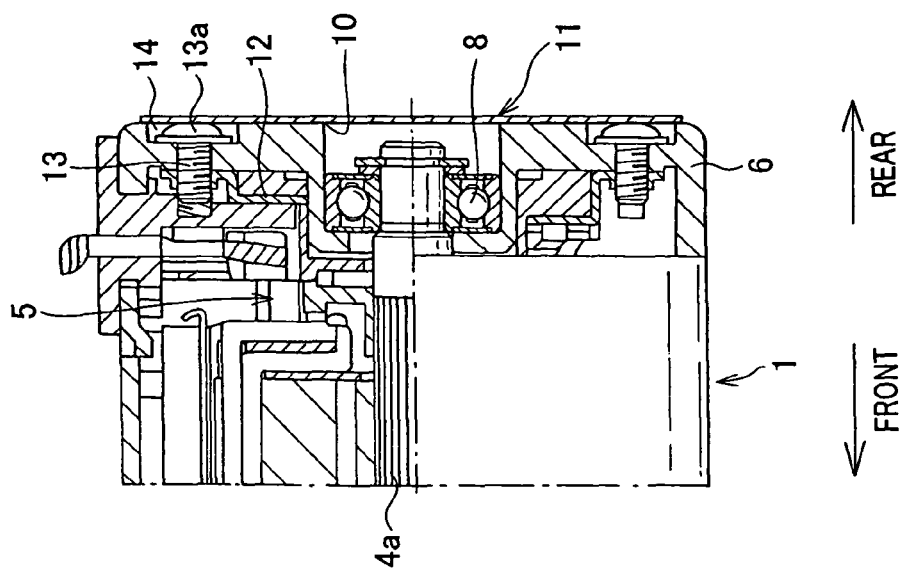
FIG. 2A
FIG. 2B

STARTER MOTOR HAVING SEAL PLATE TO SEAL BEARING BOX FORMED IN END FRAME

CROSS-REFERENCE TO RELATED APPLICATION

This application is based on and claims priority from Japanese Patent Application No. 2007-304024, filed on Nov. 26, 2007, the content of which is hereby incorporated by reference in its entirety into this application.

BACKGROUND OF THE INVENTION

1. Technical Field of the Invention

The present invention relates generally to starter motors for starting engines. More particularly, the invention relates to a starter motor which includes a seal plate that hermetically seals the open end of a bearing box formed in an end frame of the starter motor.

2. Description of the Related Art

Japanese Patent No. 3575359, an English equivalent of which is U.S. Pat. No. 6,570,283 B2, discloses a starter motor that generates torque for starting an engine of a motor vehicle.

The starter motor includes, as shown in FIG. 4, a cylindrical bearing box 110 formed at the radial center of a discoid end frame 100. A ball bearing 120 is disposed in the bearing box 110 to rotatably support a rear end portion of an armature shaft 130.

Further, from the open end of the bearing box 110, a cup-shaped bearing cover 140 is inserted in the bearing box 110 to cover the ball bearing 120, thereby sealing the ball bearing 120 within the bearing box 110. The bearing cover 140 is made of rubber or soft resin. The bearing cover 140 has a plurality of annular projections 141 formed on the outer periphery of a cylindrical side wall of the bearing cover 140. The annular projections 141 are press-fit, with a small pressure, to the inner surface of the cylindrical side wall of the bearing box 110.

In the above starter motor, since the bearing cover 140 is made of rubber or soft resin, it is difficult to control the dimension of the bearing cover 140. Moreover, with the annular projections 141, the shape of the bearing cover 140 is complicated, resulting in an increase in the manufacturing cost of the starter motor.

Furthermore, since the bearing cover 140 is press-fit into the bearing box 110 only with a small pressure, the sealing performance of the bearing cover 140 may be lowered by heat generated in the starter motor (e.g., heat generated by brushes of the starter motor) and/or the influence of high temperature inside an engine compartment in which the starter motor is installed. As a result, in the worst case, the bearing cover 140 may be detached from the bearing box 110 by vibration of the vehicle during running.

In addition, to reliably block foreign matter, such as dust or water, from reaching the ball bearing 120, it is necessary to provide a sufficient number of the annular projections 141 in alignment with each in the axial direction of the bearing cover 140. However, this will increase the axial length of the bearing cover 140, and thus will increase the axial length of the bearing box 110 and that of the entire starter motor.

SUMMARY OF THE INVENTION

The present invention has been made in view of the above-mentioned problems.

It is, therefore, a primary object of the present invention to provide a starter motor having an improved structure, by which it is possible to seal a bearing box formed in an end frame of the starter motor reliably, easily, and at low cost.

According to the present invention, there is provided a starter motor which includes: 1) a hollow yoke having an open end; 2) a magnetic field system provided on an inner periphery of the yoke; 3) an armature surrounded by the magnetic field system with a predetermined gap between the magnetic field system and the armature, the armature having an armature shaft; 4) an end frame that closes the open end of the yoke and has a bearing box formed therein, the bearing box being recessed inward of the yoke from an end face of the end frame and having an open end on the end face of the end frame, the bearing box also having a bearing disposed therein to rotatably support an end portion of the armature shaft; and 5) a flexible seal plate that is attached on the end face of the end frame to hermetically seal the open end of the bearing box formed in the end frame.

With the above configuration, the open end of the bearing box formed in the end frame is hermetically sealed only by attaching the seal plate on the end face of the end frame. Therefore, compared to the bearing cover disclosed by Japanese Patent No. 3575359, it is possible to much more easily seal the inside of the bearing box from the outside.

Further, since the seal plate is flexible, it can be reliably prevented from being detached from the end face of the end frame due to heat generated in the starter motor and/or the influence of high temperature inside the engine compartment in which the starter motor is installed. As a result, high sealing performance of the seal plate can be ensured.

Furthermore, the seal plate can be easily formed by blanking with a simple blanking die. Consequently, the manufacturing cost of the starter motor can be reduced in comparison with the starter motor disclosed by Japanese Patent No. 3575359.

In addition, the seal plate may have a very small axial length (i.e., a very small thickness), so that the axial length of the entire starter motor can be reduced in comparison with the starter motor disclosed by Japanese Patent No. 3575359.

In one preferred embodiment of the invention, the seal plate has a feature that once it is taken off from the end face of the end frame, it cannot be attached to the end face of the end frame again or it leaves a trace on the end face.

In another preferred embodiment of the invention, the seal plate is bonded to the end face of the end frame by an adhesive, with the adhesive applied on the whole of an end face of the seal plate facing the end face of the end frame; the adhesive has a feature that it is changed in color when water adheres thereto.

In yet another preferred embodiment of the invention, the seal plate is bonded to the end face of the end frame by an adhesive, with the adhesive applied on the whole of an end face of the seal plate facing the end face of the end frame; the adhesive has a feature that it is changed in color when subject to a temperature higher than a withstand temperature of the starter motor.

In still another preferred embodiment of the invention, the seal plate has an outer surface thereof painted with a material; the material has a feature that it is changed in color when subject to a temperature higher than the withstand temperature of the starter motor.

In yet still another preferred embodiment of the invention, the seal plate is made up of a laminate that is formed by laminating a thin aluminum sheet and a polyester film.

Further, the laminate preferably further includes a film material interposed between the thin aluminum sheet and the polyester film; the film material has a feature that it is changed in color when subject to a temperature higher than the withstand temperature of the starter motor.

In another preferred embodiment of the invention, the end frame is fixed to a starter housing by means of a plurality of through bolts. Each of the through bolts is located inside of the yoke in the radial direction of the armature shaft and extents in the axial direction of the armature shaft through the end frame. The end frame has a plurality of countersunk holes formed therein to sink heads of the through bolts. The seal plate is so provided as to hermetically seal the countersunk holes as well as the open end of the bearing box formed in the end frame.

In yet another preferred embodiment of the invention, the starter motor further includes brushes for supplying electric current to the armature and a holder plate for holding the brushes. The holder plate is fixed to the end frame by means of a plurality of screws. The end frame has a plurality of countersunk holes formed therein to sink heads of the screws. The seal plate is so provided as to hermetically seal the countersunk holes as well as the open end of the bearing box formed in the end frame.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 1A is a partially cross-sectional side view showing the overall structure of a starter motor according to the first embodiment of the invention;

FIG. 1B is a rear end view of the starter motor of FIG. 1A;

FIG. 2A is a partially cross-sectional side view showing the overall structure of a starter motor according to the second embodiment of the invention;

FIG. 2B is a rear end view of the starter motor of FIG. 2A;

Figure 3A:
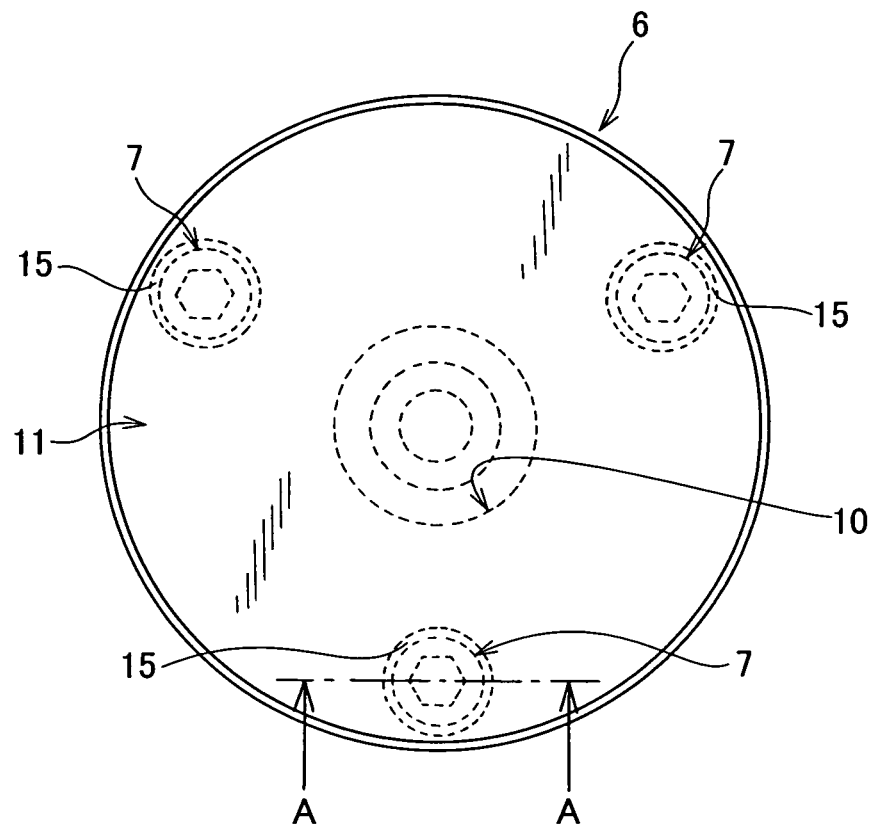
FIG. 3A is a rear end view of a starter motor according to the third embodiment of the invention.

DESCRIPTION OF PREFERRED
EMBODIMENTS

Preferred embodiments of the present invention will be described hereinafter with reference to FIGS. 1-3B.

It should be noted that, for the sake of clarity and understanding, identical components having identical functions in different embodiments of the invention have been marked, where possible, with the same reference numerals in each of the figures.

First Embodiment

FIG. 1A shows the overall structure of a starter motor 1 according to the first embodiment of the invention. The starter motor 1 is designed to be used in an engine starter to generate torque for starting an engine of a motor vehicle.

As shown in FIG. 1A, the starter motor 1 includes a magnetic field system 2 for creating a magnetic field, a cylindrical yoke 3 that surrounds the magnetic field system 2, an armature 4 that is surrounded by the magnetic field system 2 with a predetermined gap between the magnetic field system 2 and the armature 4, brushes 5 for supplying electric current from a battery (not shown) to the armature 4, and an end frame 6 that closes a rear open end of the yoke 3. In addition, as shown in FIG. 1B, a plurality of through bolts 7 are used to fix the end frame 6 to a starter housing (not shown).

The magnetic field system 2 is configured with a plurality of (e.g., 4) permanent magnets that are arranged on the inner periphery of the cylindrical yoke 3. It should be appreciated that the magnetic field system 2 may also be configured with a field coil instead of the permanent magnets.

The armature 4 includes an armature shaft 4a via which the torque generated by the starter motor 1 is output, an armature core 4b that is serration-fit on the armature shaft 4a, and an armature coil 4c mounted on the armature core 4b. The armature coil 4c is made up of a plurality of substantially "U"-shaped armature conductors that are inserted in a two-layer form in slots formed in the armature core 4b. In addition, the rear ends of the upper-layer armature conductors are utilized as commutator segments 4d.

The brushes 5 are disposed to abut the commutator segments 4d in the axial direction of the armature shaft 4a. The brushes 5 are pressed on the commutator segments 5 by brush springs (not shown), so as to establish sliding contacts with the commutator segments 5 during rotation of the armature shaft 4a.

The end frame 6 is formed by, for example, aluminum die-casting. The end frame 6 has a cylindrical bearing box 6a formed therein. More specifically, the bearing box 6a is so formed at the radial center of the end frame 6 as to be recessed axially inward (i.e., forward in FIG. 1A) from the rear end face of the end frame 6, and has an open end 10 on the rear end face of the end frame 6. Inside the bearing box 6a, there is disposed a ball bearing 8 to rotatably support a rear end portion of the armature shaft 4a. In addition, a snap ring 9 is also mounted on the rear end portion of the armature shaft 4a backward of the ball bearing 8, so as to keep the ball bearing 8 from being detached from the rear end portion of the armature shaft 4a.

On the rear end face of the end frame 6, there is attached, by an adhesive, a circular disc-shaped seal plate 11 to close the open end 10 of the bearing box 6a. In other words, the open end 10 of the bearing box 6a is hermetically sealed by the seal plate 11, thereby preventing foreign matter, such as dust or water, from entering the inside of the bearing box 6a.

In the present embodiment, the seal plate 11 is made up of a laminate that is formed by laminating a thin aluminum sheet and a polyester film and has a thickness of about 0.05 mm. The seal plate 11 has sufficient flexibility and heat-resistance (e.g., has a withstand temperature of 200° C.).

The above-described starter motor 1 according to the present embodiment has the following advantages.

Figure 4:
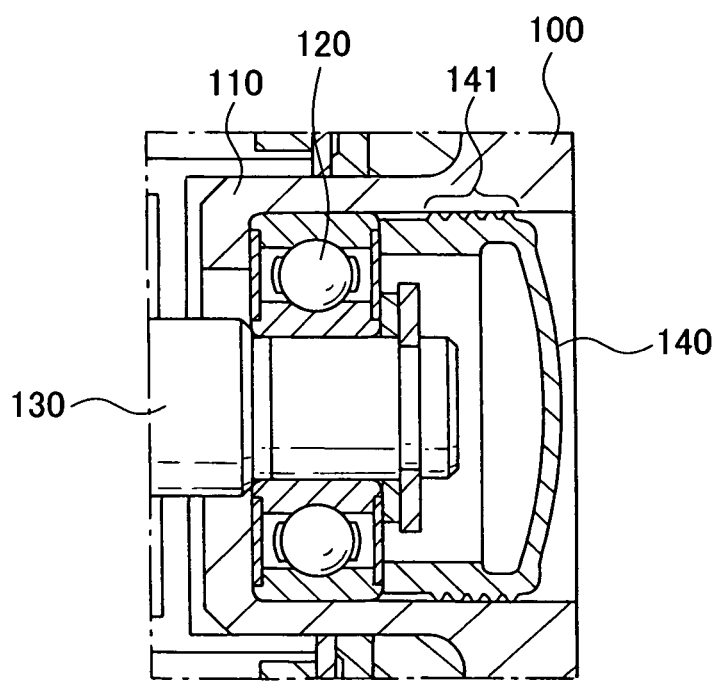
FIG. 4 is a partially cross-sectional side view showing part of a prior art starter motor.

In the present embodiment, the open end 10 of the bearing box 6a formed in the end frame 6 is hermetically sealed only by attaching the seal plate 11 on the rear end face of the end frame 6. Therefore, compared to the bearing cover disclosed by Japanese Patent No. 3575359 (see, FIG. 4), it is possible to much more easily seal the inside of the bearing box 6a from the outside.

Further, since the seal plate 11 has sufficient flexibility and heat-resistance, it can be reliably prevented from being detached from the rear end face of the end frame 6a due to heat generated by the brushes 5 and/or the influence of high temperature inside the engine compartment in which the starter motor 1 is installed. As a result, high sealing performance of the seal plate 1 can be ensured.

In the present embodiment, the seal plate 11 is made up of the laminate formed by laminating the thin aluminum sheet and the polyester film.

Consequently, it is possible to utilize the seal plate 11 as a name plate of the starter motor 1 by printing necessary information (e.g., the product number of the starter motor 1) on the thin aluminum plate. Further, with the polyester film, it is possible to protect the information printed on the thin aluminum plate.

In the present embodiment, the seal plate 11 has the shape of a circular disc.

Therefore, the seal plate 11 can be easily formed by blanking with a simple blanking die. Consequently, the manufacturing cost of the starter motor 1 can be reduced in comparison with the starter motor disclosed by Japanese Patent No. 3575359.

In addition, the bearing cover disclosed by Japanese Patent No. 3575359 is required to have a sufficiently large axial length so as to ensure the sealing performance thereof. In comparison, the seal plate 11 according to the present embodiment has a small axial length (i.e., a small thickness) of only about 0.05 mm. Consequently, the axial length of the entire starter motor 1 can be reduced in comparison with the starter motor disclosed by Japanese Patent No. 3575359.

Second Embodiment

FIG. 2A shows the overall structure of a starter motor 1 according to the second embodiment of the invention. FIG. 2B shows the shape of a seal plate 11 of the starter motor 1.

In the starter motor 1, a holder plate 12 for holding the brushes 5 is fixed to the end frame 6 by means of a plurality of (e.g., two in FIG. 2B) screws 13. Further, to sink heads 13a of the screws 13, a plurality of countersunk holes 14 are formed in the end frame 6 to open on the rear end face of the end frame 6.

Moreover, in the present embodiment, the seal plate 11 is so provided as to hermetically seal the countersunk holes 14 as well as the open end 10 of the bearing box 6a.

More specifically, in the present embodiment, the seal plate 11 is formed with a sufficiently large diameter with which it is possible for the seal plate 11 to close the countersunk holes 14 as well as the open end 10 of the bearing box 6a. As a matter of course, the diameter of the seal plate 11 is greater in the present embodiment than in the first embodiment.

With such a seal plate 11, it is possible to reliably seal the countersunk holes 14 formed in the end frame 6 without employing any other sealing means, such as O-rings.

Third Embodiment

Figure 3B:
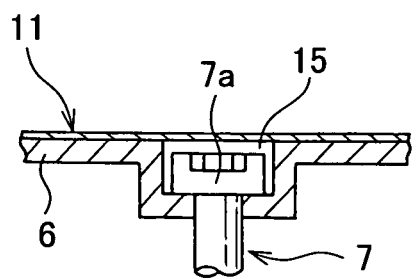
FIG. 3B is a cross-sectional view taken along the line A-A in FIG. 3A.

FIG. 3A shows the shape of a seal plate 11 of a starter motor 1 according to the third embodiment of the invention. FIG. 3B shows the shape of countersunk holes 15 formed in the end frame 6 of the starter motor 1.

In the starter motor 1, each of the through bolts is located inside of the yoke 3 in the radial direction of the armature shaft 4a. Further, each of the through bolts 7 extents from the rear side of the end frame 6 in the axial direction of the armature shaft 4a, through the end frame 6 and the gap between a circumferentially-adjacent pair of the permanent magnets of the magnetic field system 2, to be fixed to the starter housing.

Furthermore, to sink heads 7a of the through bolts 7, a plurality of countersunk holes 15 are formed in the end frame 6 to open on the rear end face of the end frame 6, as shown in FIG. 3B.

Moreover, in the present embodiment, the seal plate 11 is so provided as to hermetically seal the countersunk holes 15 as well as the open end 10 of the bearing box 6a.

More specifically, in the present embodiment, the seal plate 11 is formed with a sufficiently large diameter to cover the entire rear end face of the end frame 6. As a matter of course, the diameter of the seal plate 11 is greater in the present embodiment than in the first embodiment.

With such a seal plate 11, it is possible to reliably seal the countersunk holes 15 formed in the end frame 6 without employing any other sealing means, such as O-rings.

In addition, the end frame 6 is generally made of a metal, such as iron or aluminum, and thus a rust-proofing treatment is generally required for the rear end face of the end frame 6. However, with the seal plate 11, it is possible to make the end frame 6 rust-proof without performing any rust-proofing treatment for the rear end face of the end frame 6.

Fourth Embodiment

This embodiment illustrates a starter motor 1 in which the seal plate 11 has a feature that once it is taken off from the rear end face of the end frame 6, it cannot be bonded (or attached) to the rear end face again or it leaves a trace on the rear end face. The trace may be, for example, letters such as "OPENED" or "VOID".

With the above feature of the seal plate 11, when the starter motor 1 is in a fault condition and sent to the manufacturer to receive a diagnosis, the diagnostician can easily diagnose whether the fault condition is caused by a poor manufacturing quality of the starter motor 1 or by an improper decomposition of the starter motor 1 by the user.

Fifth Embodiment

This embodiment illustrates a starter motor 1 in which the seal plate 11 is bonded to the rear end face of the end frame 6 with the adhesive applied on the whole of the end face of the seal plate 11 facing the rear end face of the end frame 6. Further, the adhesive has a feature that it is changed in color when water adheres thereto.

With the above feature of the adhesive, when the starter motor 1 is in a fault condition, it is possible to easily diagnose whether the fault condition is caused by an invasion of water into the inside of the starter motor 1 by checking whether the adhesive is changed in color.

Sixth Embodiment

This embodiment illustrates a starter motor 1 in which the seal plate 11 is bonded to the rear end face of the end frame 6 with the adhesive applied on the whole of the end face of the seal plate 11 facing the rear end face of the end frame 6. Further, the adhesive has a feature that it is changed in color when subject to a temperature higher than the withstand temperature of the starter motor 1.

When the temperature of the starter motor 1 exceeds the withstand temperature due to the influence of an abnormally high temperature inside the engine compartment or a continuous starting operation of the starter motor 1, a failure of the starter motor 1 may occur, and in the worst case, the starter motor 1 may become unable to start the engine.

With the above feature of the adhesive according to the present embodiment, when the starter motor 1 is in a fault condition and sent to the manufacturer to receive a diagnosis, the diagnostician can easily diagnose whether the fault condition is caused by a poor manufacturing quality of the starter motor 1 or by an improper operation of the starter motor 1 at a higher temperature than the withstand temperature. More specifically, the diagnostician can make the diagnosis only by checking whether the adhesive is changed in color without decomposing the starter motor 1.

Seventh Embodiment

This embodiment illustrates a starter motor 1 in which the seal plate 11 has the outer surface thereof painted with a material; the material has a feature that it is changed in color when subject to a temperature higher than the withstand temperature of the starter motor 1.

As described in the previous embodiment, when the temperature of the starter motor 1 exceeds the withstand temperature, a failure of the starter motor 1 may occur, and in the worst case, the starter motor 1 may become unable to start the engine.

With the above feature of the material painted on the seal plate 11, when the starter motor 1 is in a fault condition and sent to the manufacturer to receive a diagnosis, the diagnostician can easily diagnose whether the fault condition is caused by a poor manufacturing quality of the starter motor 1 or by an improper operation of the starter motor 1 at a higher temperature than the withstand temperature. More specifically, the diagnostician can make the diagnosis only by checking whether the paint is changed in color without decomposing the starter motor 1.

Eighth Embodiment

This embodiment illustrates a starter motor 1 in which the laminate, which makes up the seal plate 11, further includes a film material that is interposed between the thin aluminum sheet and the polyester film. Further, the film material has a feature that it is changed in color when subject to a temperature higher than the withstand temperature of the starter motor 1.

With the above feature of the film material, when the starter motor 1 is in a fault condition and sent to the manufacturer to receive a diagnosis, the diagnostician can easily diagnose whether the fault condition is caused by a poor manufacturing quality of the starter motor 1 or by an improper operation of the starter motor 1 at a higher temperature than the withstand temperature. More specifically, the diagnostician can make the diagnosis only by checking whether the film material included the seal plate 11 is changed in color without decomposing the starter motor 1.

While the above particular embodiments of the invention have been shown and described, it will be understood by those skilled in the art that various modifications, changes, and improvements may be made without departing from the spirit of the disclosed concept.

For example, in the first embodiment, the seal plate 11 is configured with the laminate that is formed by laminating the thin aluminum sheet and the polyester film. However, the seal plate 11 may alternatively have any other configuration which can impart sufficient flexibility and heat-resistance to the seal plate 11.

Moreover, in the first embodiment, the starter motor 1 includes a surface-type commutator where the commutator segments 4d are so provided as to abut the brushes 5 in the axial direction of the armature shaft 4a. However, the starter motor 1 may alternatively include a cylindrical-type commutator where the commutator segments 4a are so provided in the form of a cylinder as to abut the brushes 5, which are provided on the radially outward of the commutator segments 4a, in the radial direction of the armature shaft 5.

What is claimed is:

1. A starter motor comprising:
   a hollow yoke having an open end;
   a magnetic field system provided on an inner periphery of the yoke;
   an armature surrounded by the magnetic field system with a predetermined gap between the magnetic field system and the armature, the armature having an armature shaft;
   an end frame that closes the open end of the yoke and has a bearing box formed therein, the bearing box being recessed inward of the yoke from a rear end face of the end frame and having an open end on the rear end face of the end frame, the bearing box also having a bearing disposed therein to rotatably support an end portion of the armature shaft; and
   a flexible seal plate that is located entirely outside of the bearing box and attached on the rear end face of the end frame to close the open end of the bearing box and form a hermetic seal between the seal plate and the rear end face of the end frame, thereby blocking foreign matter from entering the inside of the bearing box via the open end of the bearing box,
   wherein the seal plate covers the rear end face of the end frame in plan view such that the entire outer peripheral edge of the seal plate is closer in proximity to the open end of the bearing box than the outer periphery of the rear end face of the end frame.

2. The starter motor as set forth in claim 1, wherein a trace of characters remains on the rear end face of the end frame once the seal plate is taken off from the rear end face of the end frame.

3. The starter motor as set forth in claim 1, wherein the seal plate is bonded to the rear end face of the end frame by an adhesive, with the adhesive applied on the whole of a face of the seal plate facing the rear end face of the end frame, and wherein the adhesive changes color when exposed to water.

4. The starter motor as set forth in claim 1, wherein the seal plate is bonded to the rear end face of the end frame by an adhesive, with the adhesive applied on the whole of a face of the seal plate facing the rear end face of the end frame, and wherein the adhesive changes color when subjected to a temperature higher than a threshold temperature of the starter motor.

5. The starter motor as set forth in claim 1, wherein an outer surface of the seal plate is painted with a material that changes color when subjected to a temperature higher than a threshold temperature of the starter motor.

6. The starter motor as set forth in claim 1, wherein the seal plate is made from a laminate that is formed by laminating a thin aluminum sheet and a polyester film.

7. The starter motor as set forth in claim 6, wherein the laminate further includes a film material interposed between the thin aluminum sheet and the polyester film, and the film material changes color when subjected to a temperature higher than a threshold temperature of the starter motor.

8. The starter motor as set forth in claim 1, wherein the end frame is fixed to a starter housing by a plurality of through bolts, each of the through bolts is located inside of the yoke in a radial direction with respect to the armature shaft and extends in an axial direction of the armature shaft through the end frame, and
   the end frame has a plurality of recessed holes formed therein that receive the heads of the through bolts.

9. The starter motor as set forth in claim 1, further comprising brushes for supplying electric current to the armature and a holder plate for holding the brushes, wherein the holder plate is fixed to the end frame by means of a plurality of screws, and the end frame has a plurality of recessed holes formed therein that receive the heads of the screws.

10. The starter motor as set forth in claim 1, wherein the rear end face is located on a rear side of the starter motor such that the rear side is closer to the armature and a front side of the starter is located farther away from the armature on an opposite side from the rear side.

11. The starter motor as set forth in claim 1, wherein all of the rear end face located inside of the outer periphery is covered by the seal plate.

12. The starter motor as set forth in claim 11, wherein the rear end face is circular and the seal plate is circular such that the diameter of the seal plate is smaller than the diameter of the rear end face of the end frame.

13. The starter motor as set forth in claim 1, wherein a front surface and a rear surface of the seal plate are completely flat.

14. The starter motor as set forth in claim 1, wherein the seal plate has a thickness of about 0.05 mm.

15. The starter motor as set forth in claim 1, wherein the seal plate has a heat resistance of up to 200° C.

16. The starter motor as set forth in claim 1, wherein the seal plate is bonded to the rear end face of the end frame such that the seal plate cannot be attached to the rear end face of the end frame again once the seal plate has been removed.

\* \* \* \* \*